United States Patent Office 2,807,541
Patented Sept. 24, 1957

2,807,541

WELDING ALUMINIUM ALLOYS

Peter Thomas Houldcroft, London, England, assignor, by mesne assignments, to National Research Development Corporation, London, England, a British body corporate No Drawing. Application July 5, 1955,
Serial No. 520,108

Claims priority, application Great Britain July 9, 1954

4 Claims. (Cl. 75—143)

When aluminium alloys are welded using a filler material, dilution of the filler material by the parent metal occurs to an extent which varies with the design of the joint and with the technique of welding. This dilution has a considerable influence on the composition of the weld bead and it has been found that the filler metal in the weld bead can be diluted by as much as 80 percent or more when welding a joint in which the edges are prepared with a square close butt edge.

When making a fillet weld, however, dilution may be as little as 25%. It will be seen, therefore, that any filler rod of a certain composition will produce weld beads of widely differing compositions and properties depending upon the type of joint in which it is used.

The present invention enables a weld bead to be produced in widely differing circumstances and dilutions in which the composition of the bead remains satisfactory in all the circumstances within certain limits. The present invention is concerned with the welding of aluminium-copper-silicon-magnesium alloys generally known as Duralumin type alloys. These alloys contain between 3.5 and 5 percent of copper, and 0.4 to 1.2% of magnesium, up to 0.9% silicon, and up to 1.2% manganese. Commercially the limits for copper are usually between 3.9 and 4.5 percent. Usually they also contain impurities which may be present in the following proportions: up to 1% iron, up to 0.2% nickel and zinc, up to 0.3% titanium and chrome, and up to .05% lead, tin and antimony.

The invention consists in using, for welding Duralumin type alloys, a filler alloy containing between 5.5 and 7.5 percent of copper, between 3.0 and 4.0 percent of silicon and between 0.3 and 1.0 percent of magnesium, the remainder being aluminium with small amounts of grain refining additions such as titanium. Of these additional elements titanium is present in a quantity between 0.1 and 0.8 percent, and one or more of the elements manganese up to 1.0 percent, iron up to 1.0 percent, zinc up to 0.8 percent may be present. Preferably 7 percent of copper, 3.5 percent of silicon and 0.6 percent of magnesium is used with 0.5 percent of titanium. A filler alloy containing these metals within the limits stated gives a satisfactory weld bead composition up to 70 percent dilution. For welding joints of a design giving greater dilution than 70 percent, it is probably more satisfactory to use an aluminium alloy containing 10 percent of silicon and 4 percent of copper.

With parent metal having a copper content of 3.9 percent the preferred alloy gives a copper content in the weld of 4.8 percent at 70 percent dilution and 6.25 percent at 25 percent dilution. At the upper copper limit of 4.5 percent of copper in the parent metal the weld contains 5.25 percent of copper at 70 percent dilution and 6.4 percent copper at 25 percent dilution.

Using the preferred alloy, the silicon content of the weld with 0.5 percent silicon content in the parent metal is 1.4 percent silicon at 70 percent dilution and 2.7 percent silicon at 25 percent dilution. With a parent metal containing 1.2 percent silicon the weld contains 1.9 percent silicon at 70 percent dilution and 2.9 percent silicon at 25 percent dilution. The effect of silicon is to make aluminium copper alloys less susceptible to cracking. It seems that in weld metal containing about 5 percent copper a silicon content of about 2 percent gives the most advantage and that there is little advantage in increasing the silicon content much above this since at higher silicon contents the properties of the weld suffer and the weld becomes sluggish in ageing.

It is not possible to eliminate magnesium from the weld metal, neither is there any considerable advantage in increasing the magnesium content over that generally present in the normal Duralumin type alloys. A higher magnesium content gives greater strength but lower ductility. The range of magnesium content of from 0.3 percent to 0.6 percent in the filler alloy is a suitable compromise.

I claim:

1. A process of welding aluminium silicon copper magnesium alloys known as Duralumin type alloys, by using a filler alloy comprising between 5.5 and 7.5 percent of copper, between 3.0 and 4.0 percent of silicon, between 0.3 and 1.0 percent of magnesium, between 0.1 and 0.8 percent titanium, up to 1.0 percent manganese, up to 1.0 percent iron and up to 0.8 percent zinc, the remainder being aluminium.

2. A process according to claim 1, in which the filler alloy contains 7 percent of copper, 3.5 percent of silicon, 0.6 percent magnesium and 0.5 percent of titanium.

3. For welding aluminium copper magnesium silicon alloys known as Duralumin type alloys, a filler alloy comprising between 5.5 and 7.5 percent of copper, between 3.0 and 4.0 percent of silicon, between 0.3 and 1.0 percent of magnesium, between 0.1 and 0.8 percent titanium, up to 1.0 percent manganese, up to 1.0 percent iron and up to 0.8 percent zinc, the remainder being aluminium.

4. A filler alloy according to claim 3 containing 7.0 percent of copper, 3.5 percent of silicon, 0.6 percent magnesium and 0.5 percent of titanium.

References Cited in the file of this patent

UNITED STATES PATENTS 2,271,210    Scott _____ Jan. 27, 1942